(12) United States Patent
Luster

(10) Patent No.: US 8,608,478 B2
(45) Date of Patent: Dec. 17, 2013

(54) ELECTRONIC CLIPBOARD MODULE WITH REMOTE UNIT

(76) Inventor: Jarvis L. Luster, Aurora, IL (US)

( * ) Notice: Subject to any disclaimer, the term of this patent is extended or adjusted under 35 U.S.C. 154(b) by 1419 days.

(21) Appl. No.: 11/607,670

(22) Filed: Nov. 30, 2006

(65) Prior Publication Data

US 2007/0143382 A1    Jun. 21, 2007

Related U.S. Application Data

(60) Provisional application No. 60/742,479, filed on Dec. 4, 2005.

(51) Int. Cl.
    *A63B 69/00* (2006.01)
(52) U.S. Cl.
    USPC .......................................................... 434/247
(58) Field of Classification Search
    USPC .................................................. 434/247–249
    See application file for complete search history.

(56) References Cited

U.S. PATENT DOCUMENTS

| | | | | |
|---|---|---|---|---|
| 5,857,855 | A * | 1/1999 | Katayama | 434/247 |
| 6,652,284 | B2 * | 11/2003 | August et al. | 434/247 |
| 6,970,157 | B2 | 11/2005 | Siddeeq | |
| 2001/0040591 | A1 * | 11/2001 | Abbott et al. | 345/700 |
| 2004/0135879 | A1 * | 7/2004 | Stacy et al. | 348/14.02 |
| 2004/0158337 | A1 * | 8/2004 | Forest | 700/91 |
| 2006/0197835 | A1 * | 9/2006 | Anderson et al. | 348/117 |
| 2007/0290801 | A1 | 12/2007 | Powell | |

OTHER PUBLICATIONS

Morde et al. "Tele-Collaboration in Parallel WOrlds" Proceedings of the 2003 ACM SIGMM workshop on Experiential telepresence 2003. <retrieved from: http://portal.acm.org/citation.cfm?id=982484.982496>.*

* cited by examiner

*Primary Examiner* — Robert J Utama
(74) *Attorney, Agent, or Firm* — Clifford Kraft

(57) ABSTRACT

An electronic clipboard with an optional associated remote personal unit worn by a player. The clipboard can include a flat electronic unit with an optionally writeable flat display. The associated unit can be a wrist or other unit with a small display worn by a player. A protective cover can be pulled over the display to protect it during play. Plays from a library of plays, or plays written on the electronic clipboard, can be transmitted by radio to the remote personal unit and displayed. The electronic coach's clipboard that could store and recall images of plays that the coach could carry or have immediately available. Optionally real-time game photographs can be displayed on the coach's electronic clipboard.

7 Claims, 15 Drawing Sheets

US 8,608,478 B2

ELECTRONIC CLIPBOARD MODULE WITH REMOTE UNIT

This application is related to and claims priority from U.S. Provisional application No. 60/742,479 filed Dec. 4, 2005. Application 60/742,479 is hereby incorporated by reference.

BACKGROUND

1. Field of the Invention

The present invention relates generally to sports clipboards or play-boards and more particularly to an electronic clipboard module with an associated player remote unit.

2. Description of the Prior Art

Sports clipboards are known in the art and are used by coaches to sketch and record plays. Coaches also keep copies of plays in notebooks, on laptop computers, handheld computing devices and elsewhere. During a game, a coach may have no direct access to recorded plays and no way to record new plays.

In some sports like football, a one-way radio is commonly used between a coach and a player, where the player is equipped with a radio receiver and earphone or speaker in a helmet. The coach can verbally relay plays or ideas to the player. Presently, there is no way to send a visual representation of a play to the player. Currently, the NFL uses GP350, general purpose, encrypted radios manufactured by Motorola Corporation to transmit verbal instructions to quarterbacks, as well as HT750 radios, also manufactured by Motorola Corporation to send messages to referees and to request instant replays. In addition to communicating with the quarterback, an NFL head coach also is in continuous communication with all of the other coaches, his assistants on the sidelines. The coach is also normally linked via a hardware router to a defensive coordinator and a running back coach in a box above the game. In the NFL, the coach may talk to the quarterback until the play clock runs down to 15 seconds.

It is also known to photograph plays during a game and to cause these photos to be relayed to the coaching staff. These photos are normally printed out in hardcopy or displayed on a monitor.

It would be advantageous to have an electronic coach's clipboard that could store and recall images of plays that the coach could carry or have immediately available. It would also be advantageous to optionally have this electronic clipboard relay play images to a player wearing a small receiving and display device preferably on the wrist or other easily accessible place, and/or for the player to have the ability to display pre-recorded plays from his personal unit. Finally, it would be advantageous for real-time game photographs to be optionally displayed on the coach's electronic clipboard.

SUMMARY OF THE INVENTION

The present invention relates to a coach's clipboard unit that includes a housing, a display mounted on the housing, a processor coupled to a memory, the processor and memory contained in the housing with the memory containing a library of stored plays and parameters for several different sports. The processor can be adapted to display stored plays on the display, and transmit them to a portable, wearable mini-clipboard unit that can be worn on a player's wrist or elsewhere. The player can view the plays and can receive and optionally transmit verbal communication from the coach. The coach can modify a play with a pen or stylus on the clipboard's writeable display before transmitting it to the player. The coach can also design plays on the clipboard with the pen or stylus and then transmit them to the player. The display may be optionally a touch screen. The players wearable mini-clipboard can contain a processor and a storage device which can independently store and display plays on the mini-clipboard's display. A remote camera can photograph plays and transmit them to the coach's electronic clipboard for display.

Several drawings and illustrations have been presented to better aid in understanding the present invention. The scope of the present invention is not limited to what is shown in the figures.

DESCRIPTION OF THE INVENTION

The present invention relates to an electronic clipboard with an optional associated remote personal unit worn by a player. The clipboard can include a flat electronic unit with an optionally writeable or non-writeable display. The display can be of the type that is writeable with a stylus or specially adapted pen, or it can optionally be a touch screen or simply a static display. While the preferred method is to use a flat clipboard and display, any type of board or display or any shape or form is within the scope of the present invention.

In one mode of operation, the clipboard of the present invention can be used to recall plays from a library of stored plays. In this mode, the coach can simply enter a number or other identifier into the unit using a button, keypad or selecting a play number from a menu, and the stored play can be recalled and displayed. The recalled play can also be relayed by radio to the player personal unit if desired (and allowed by the league). The clipboard can be equipped with several control buttons or, optionally, a small keyboard. It is also possible that a number can be directly selected on the display. In this mode, a diagram of the corresponding play will normally be displayed. The present invention can allow any stored play to be edited or changed and re-stored. In addition, the clipboard can optionally display photographs of plays taken by a play observer during a game for examination and/or storage as well as text an any other information relevant to the game or a sport.

In an embodiment of the present invention, the coach's clipboard unit can allow writing or drawing of new play diagrams directly on the screen. In this manner, the coach can store plays for later retrieval or for immediate transmission to one of the players. The coach can modify a play using a stylus or pen on the writeable display before sending it to a player. It should be noted that the preferred embodiment of the present invention contains a writeable display; however, a non-writeable or static display is also within the scope of the present invention.

The clipboard unit of the present invention can include a microphone and optionally earphone or speaker for one or two-way communication with one or more of the players. This type of communication is more common in football where the players wear helmets, but it can also be used in other sports.

The present invention can also include a remote portable, wearable personal unit, preferably a wrist unit, that can be worn by a player and be used to receive play diagrams. The play diagrams can be transmitted from the coaches clipboard to the player's wrist unit.

Figure 1:
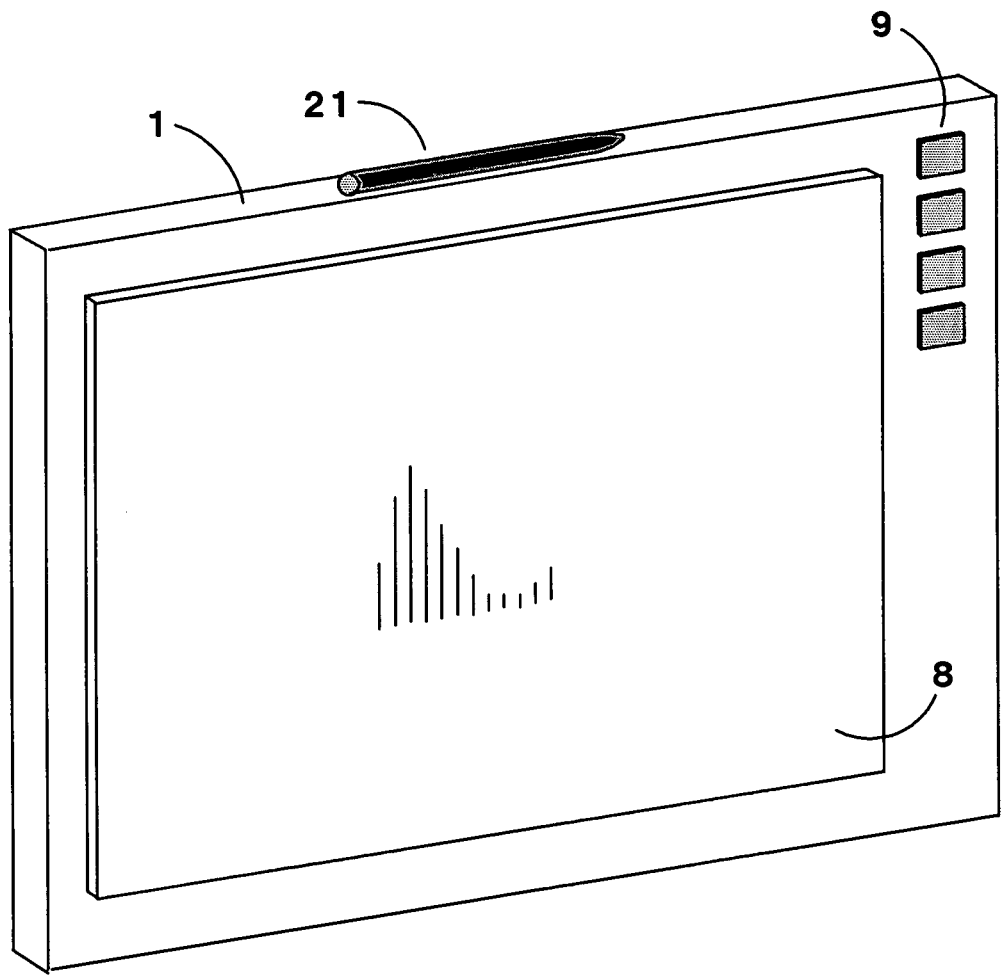
FIG. 1 shows a perspective view of the coach's clipboard in one embodiment of the present invention.

Turning to FIG. 1, an embodiment of a coach's clipboard unit 1 can be seen. The unit includes a display 8 for displaying plays or photos, a set of buttons 9 for selecting plays or other functions and a stylus or pencil 21 for writing on the screen. By manipulation of the buttons 9, a coach can bring up any stored play, or store and edited play. It is also possible to transmit a play image or photograph to a player.

Figure 2A:
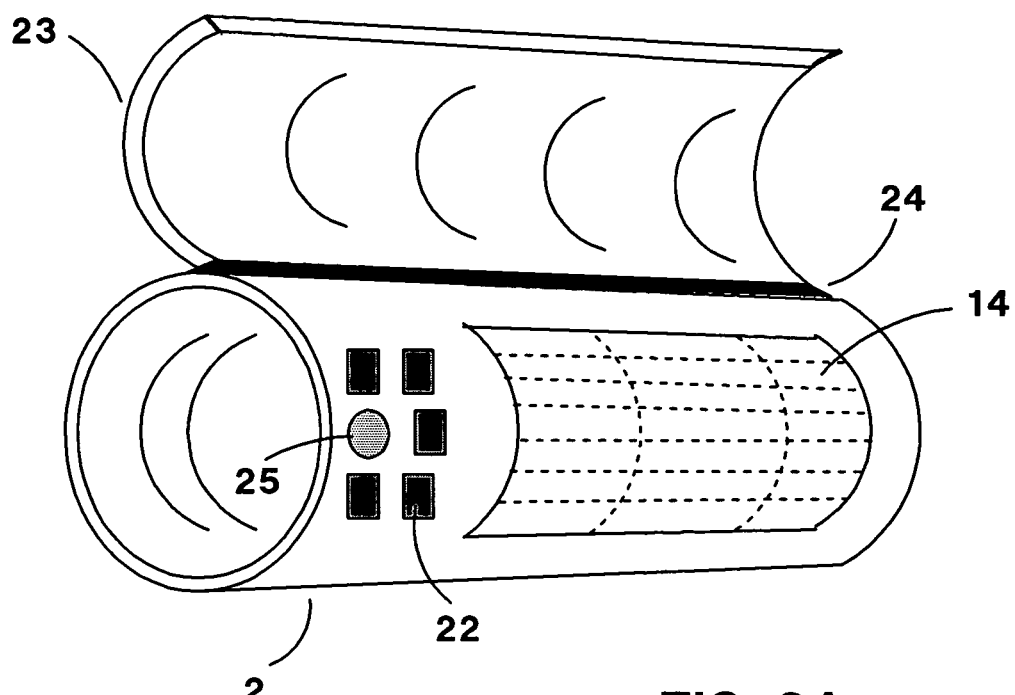
FIGS. 2A-2B show a perspective view of a player wrist unit with cover open and closed.
Figure 2B:
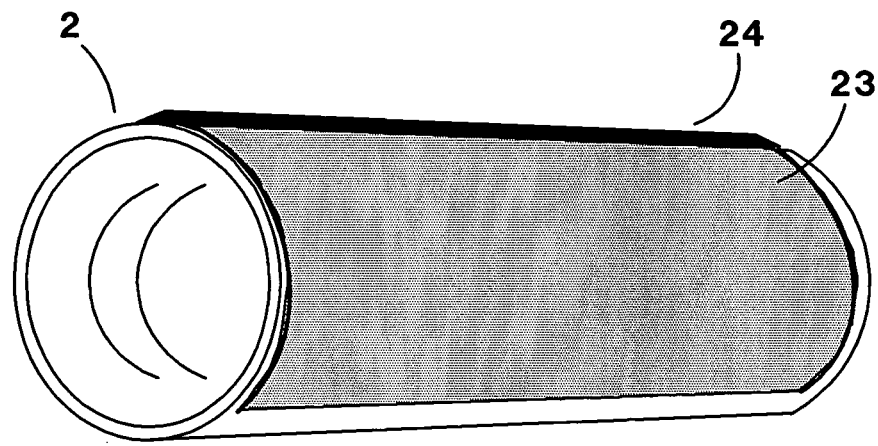

Turning to FIGS. 2A-2B, an embodiment of a player's wrist unit 2 can be seen. The unit can include a miniature rugged display 14, buttons 22, an optional speaker 25, and a cover 23 that closes over the display via a hinge 24 to protect the display during play. By manipulation of the buttons 22, a player can display stored plays, photos or transmitted plays or photos from the coach.

Figure 3:
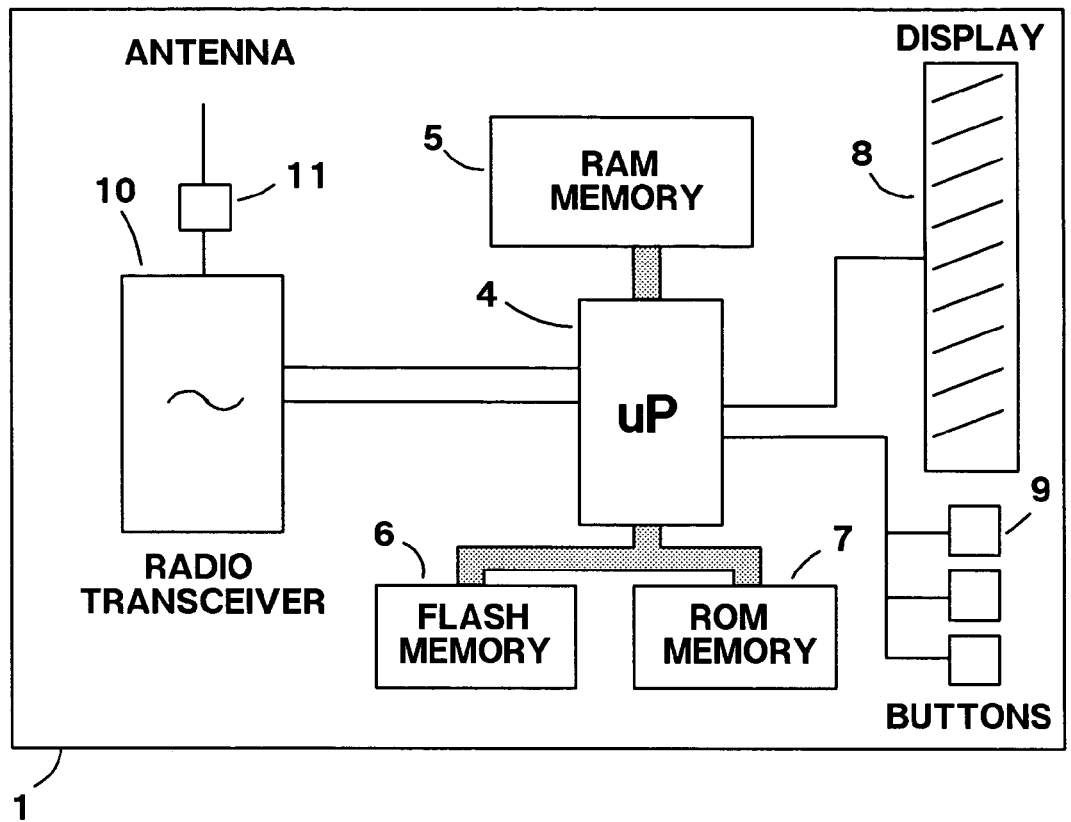
FIG. 3 shows a block diagram of an embodiment of a coach's clipboard, player's personal unit, and transmitting camera.
Figure 3:
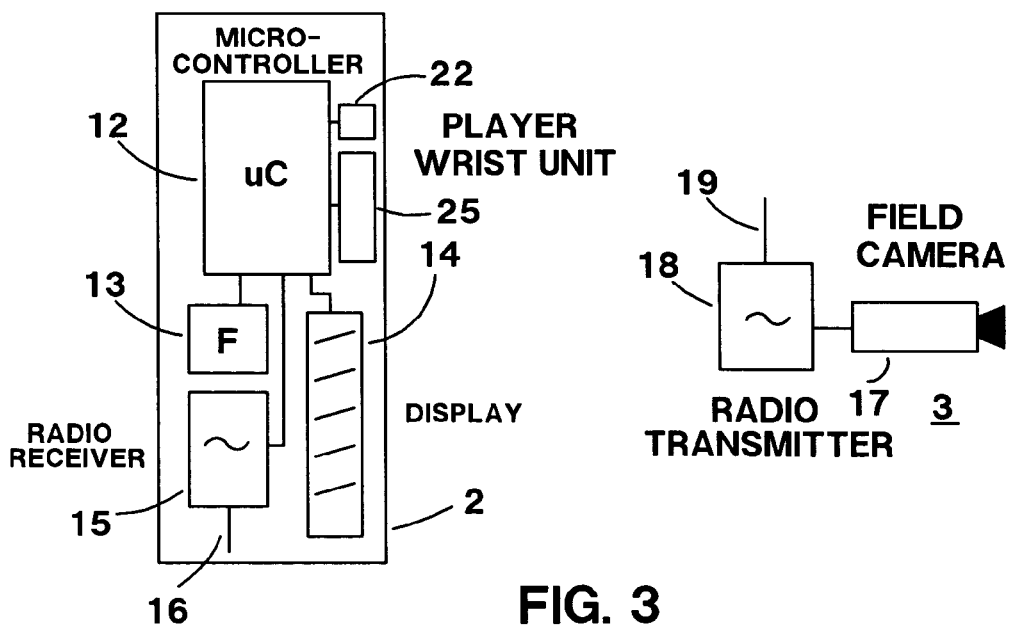

FIG. 3 shows a block diagram of a coach's clipboard 1, a player's personal unit 2 and a transmitting camera 3. The clipboard 1 can contain a microprocessor 4 or micro-controller known in the art coupled to a RAM memory 5, ROM memory 6 and flash memory 7. The arrangement of memory shown in FIG. 3 is shown to provide an example. Any arrangement or combination of memory and/or memory devices is within the scope of the present invention. The microprocessor 4 is also coupled to a display 8 and group of one or more buttons 9. The microprocessor 4 can be programmed to control the memories and to bring play images from memory and place them on the display. In addition, the display 8 can be writable with a stylus, pen or other device. The present invention can optionally allow a coach to draw in a new play on the fly on the display 8, and then store it in memory and/or transmit it immediately to one of the players on the field.

The clipboard can also contain a radio transceiver 10 with an antenna 11 or other wireless communication method such as infrared. This transceiver 10 can be a transmitter, receiver or both. A receiver can receive images from play-observer cameras and also optionally receive voice from players. The transmitter can optionally send play images or voice to a player's wrist unit or helmet speaker. Any type of radio transmission is within the scope of the present invention including AM, FM, pulse, spread spectrum (including direct spreading and frequency hopping) and any other modulation technique. Any frequency band is within the scope of the present invention including ISM bands and specially designated frequency bands. Optionally the radio communication can be by WiFi. Generally radio transmissions can be encrypted to avoid interception. Any encryption technique, symmetric or asymmetric may be used including session key and public key techniques. Session keys may be exchanged using techniques known in the art for key exchange.

FIG. 3 also shows the player's personal or wrist unit 2. This unit can contain a micro-controller 12 or other processor, an optionally flash memory 13, a display 14, buttons 22, speaker 25 and a radio receiver 15 (which could also be a transceiver) with an antenna 16. The micro-controller 12 can be programmed to display either stored plays or plays transmitted by the coach in real time. In particular, the wrist unit 2 can be used in a stand-alone mode where all plays are stored in its memory (which in FIG. 3 can be in the micro-controller 12). In this mode, the player can simply press a button to bring up the image of a play. In a second mode, the play can be transmitted and displayed by the coach or transmitted and stored for later recall and display by the player. In particular, a series or group of plays can be downloaded into the player's personal or wrist unit either wirelessly or by wire or light or by other means for recall during the game.

FIG. 3 in addition shows a transmitting camera 3 that can be used by a play-observer. It can contain a camera part 17 and a radio transmitter 18 with an antenna 19.

Figure 4:
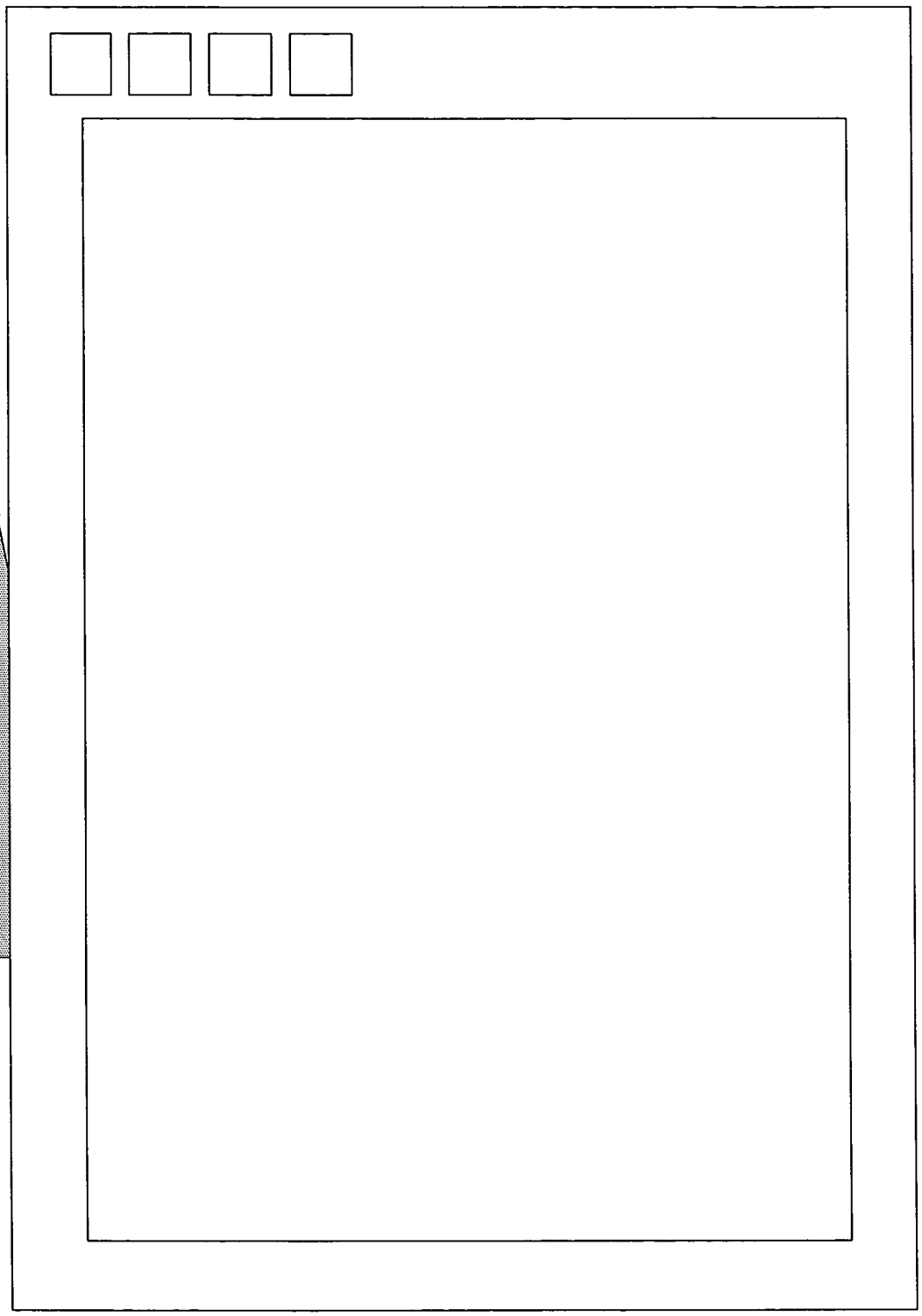
FIG. 4 shows the clipboard with a blank screen.
Figure 5:
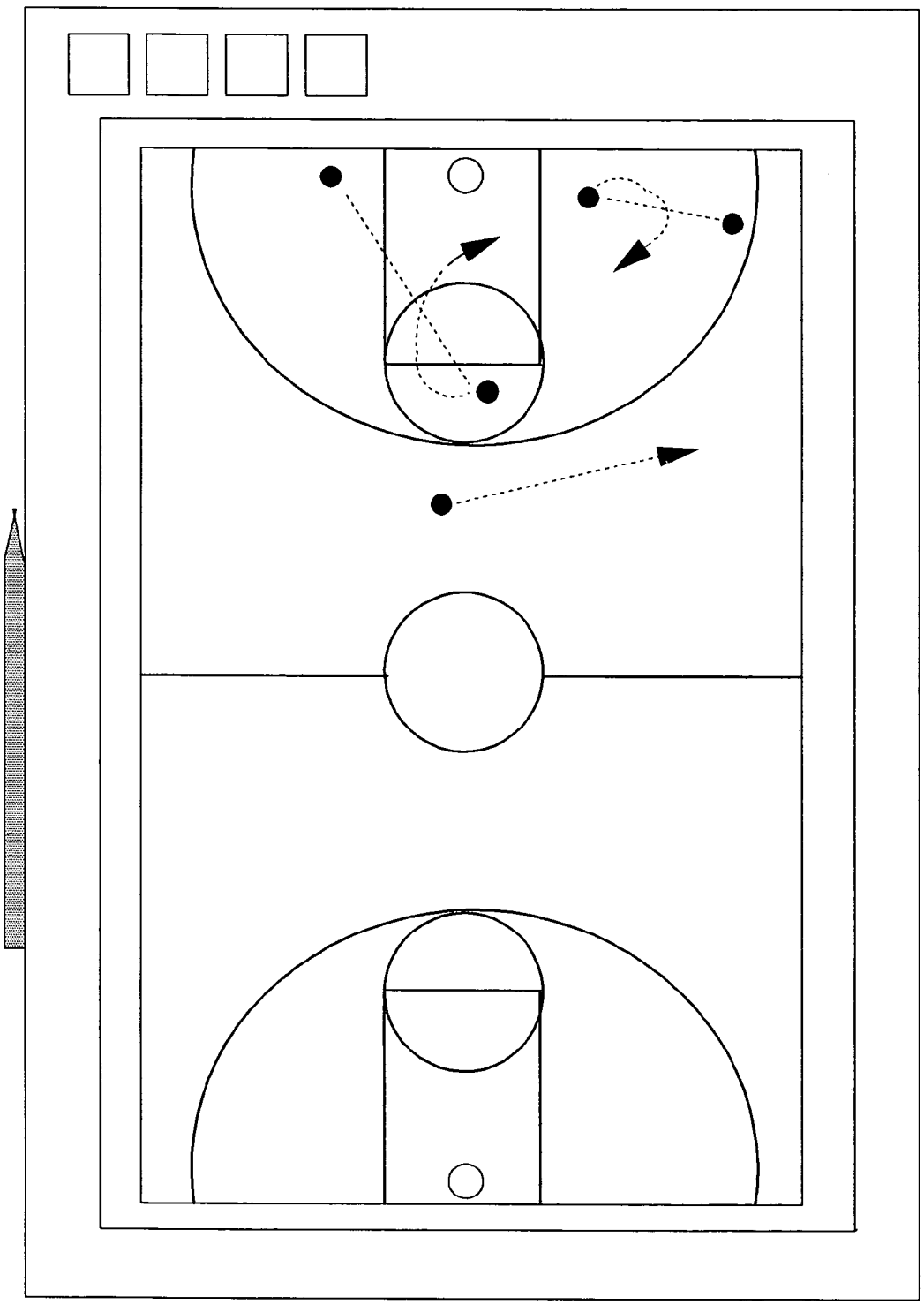
FIG. 5 shows an example basketball play displayed on the clipboard.
Figure 6:
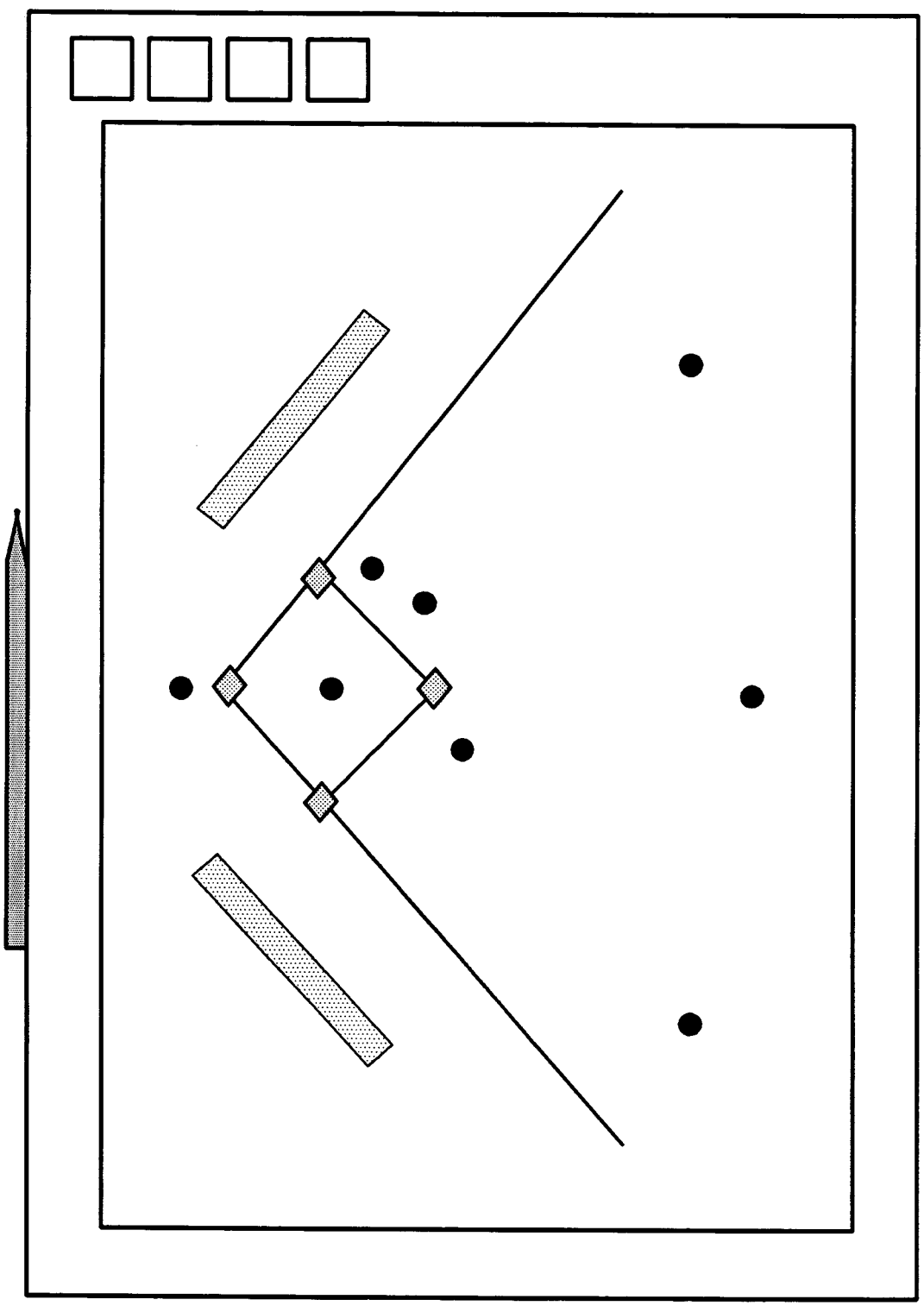
FIG. 6 is similar to FIG. 5 except that the sport is baseball.
Figure 7:
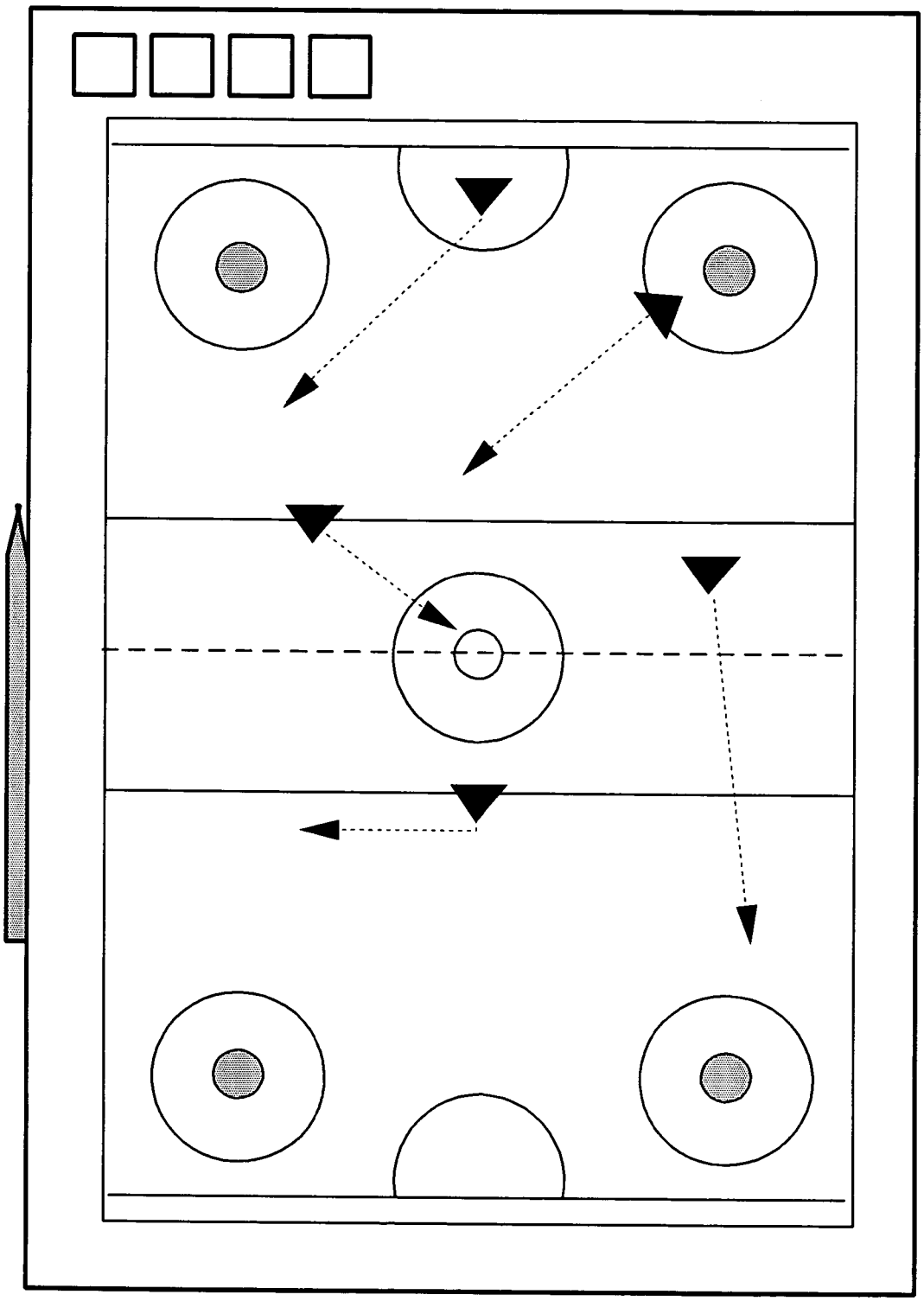
FIG. 7 is similar to FIG. 5 except that the sport is ice hockey.
Figure 8:
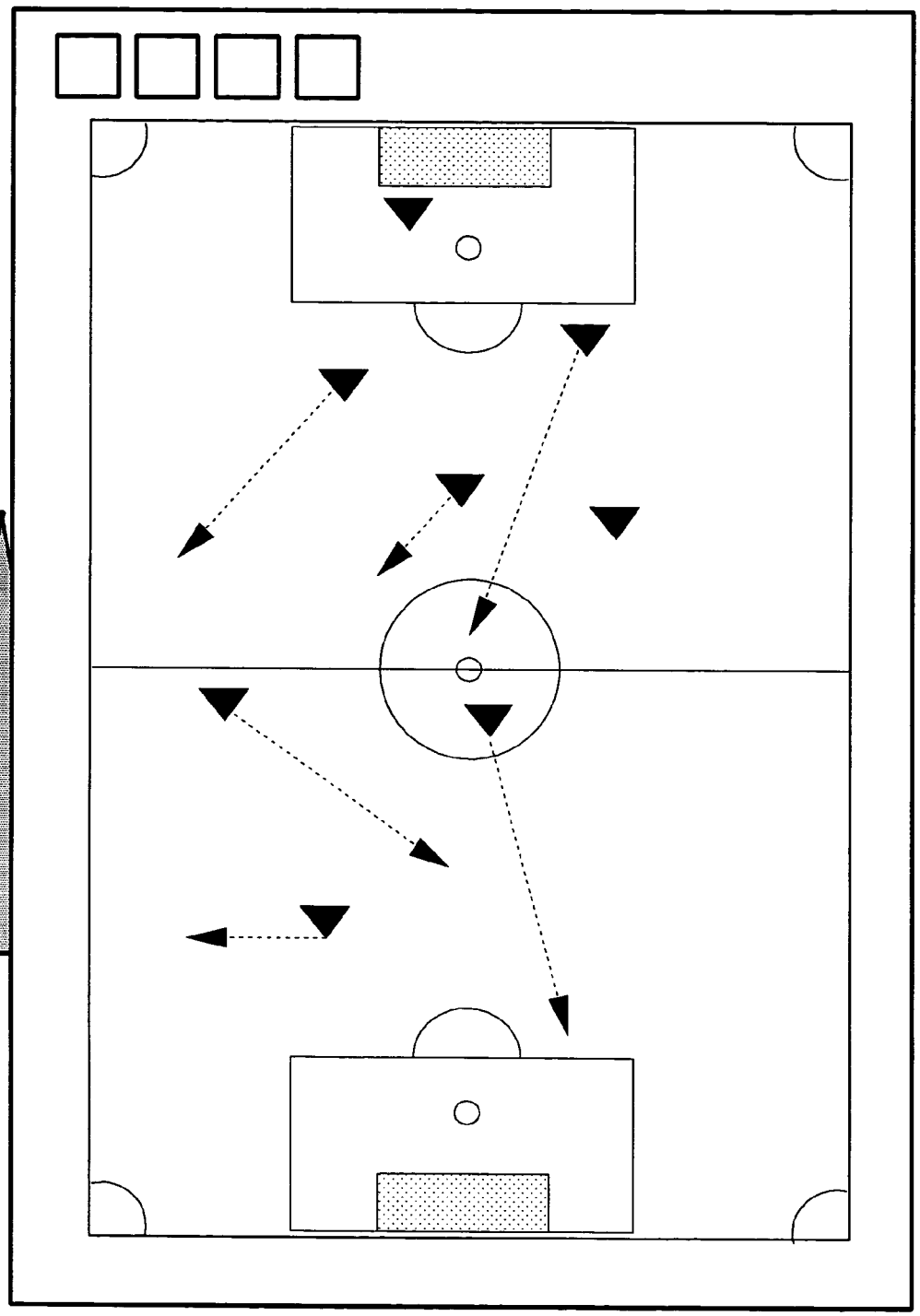
FIG. 8 is similar to FIG. 5 except that the sport is soccer.
Figure 9:
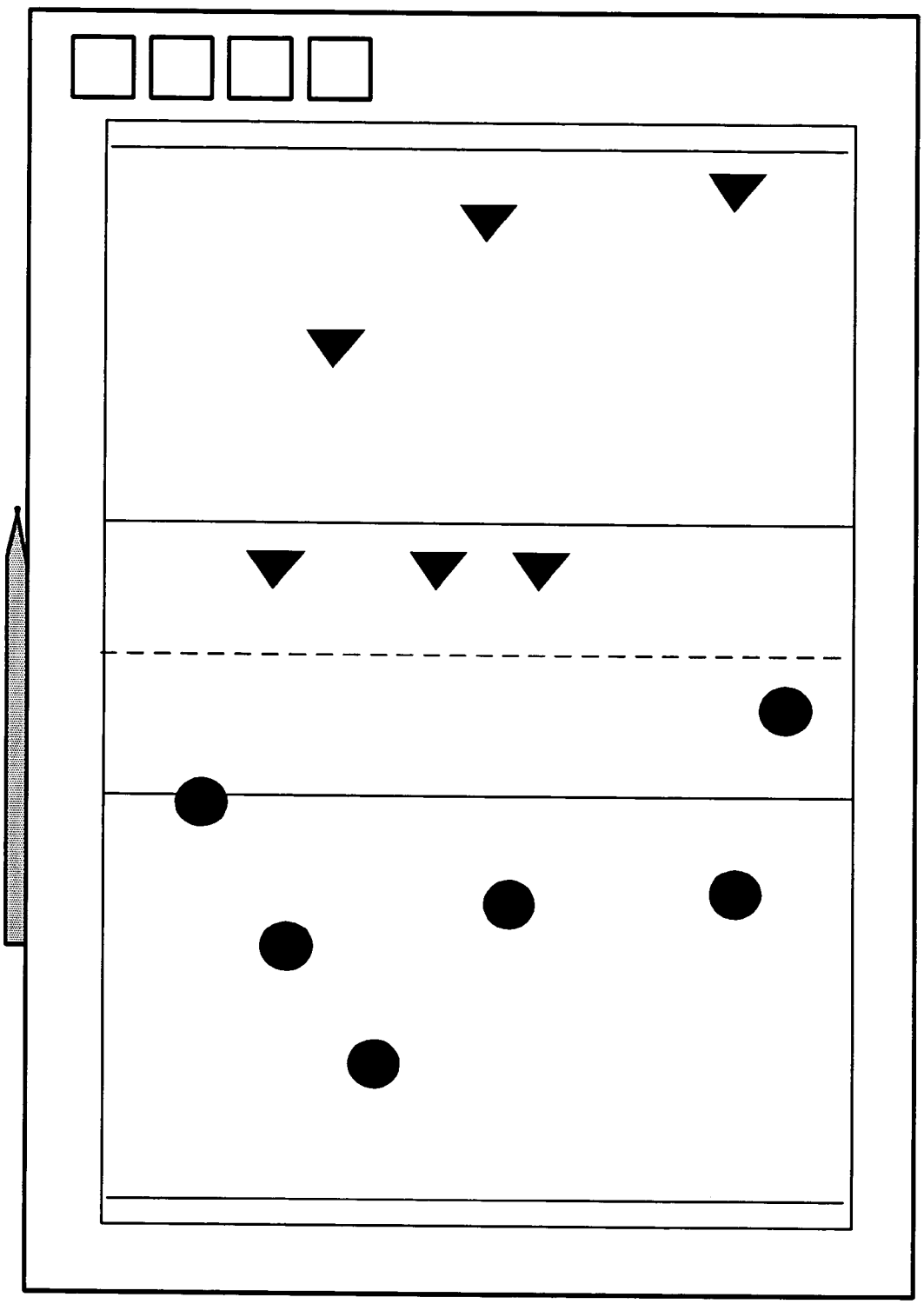
FIG. 9 is similar to FIG. 5 except that the sport is volleyball.
Figure 10:
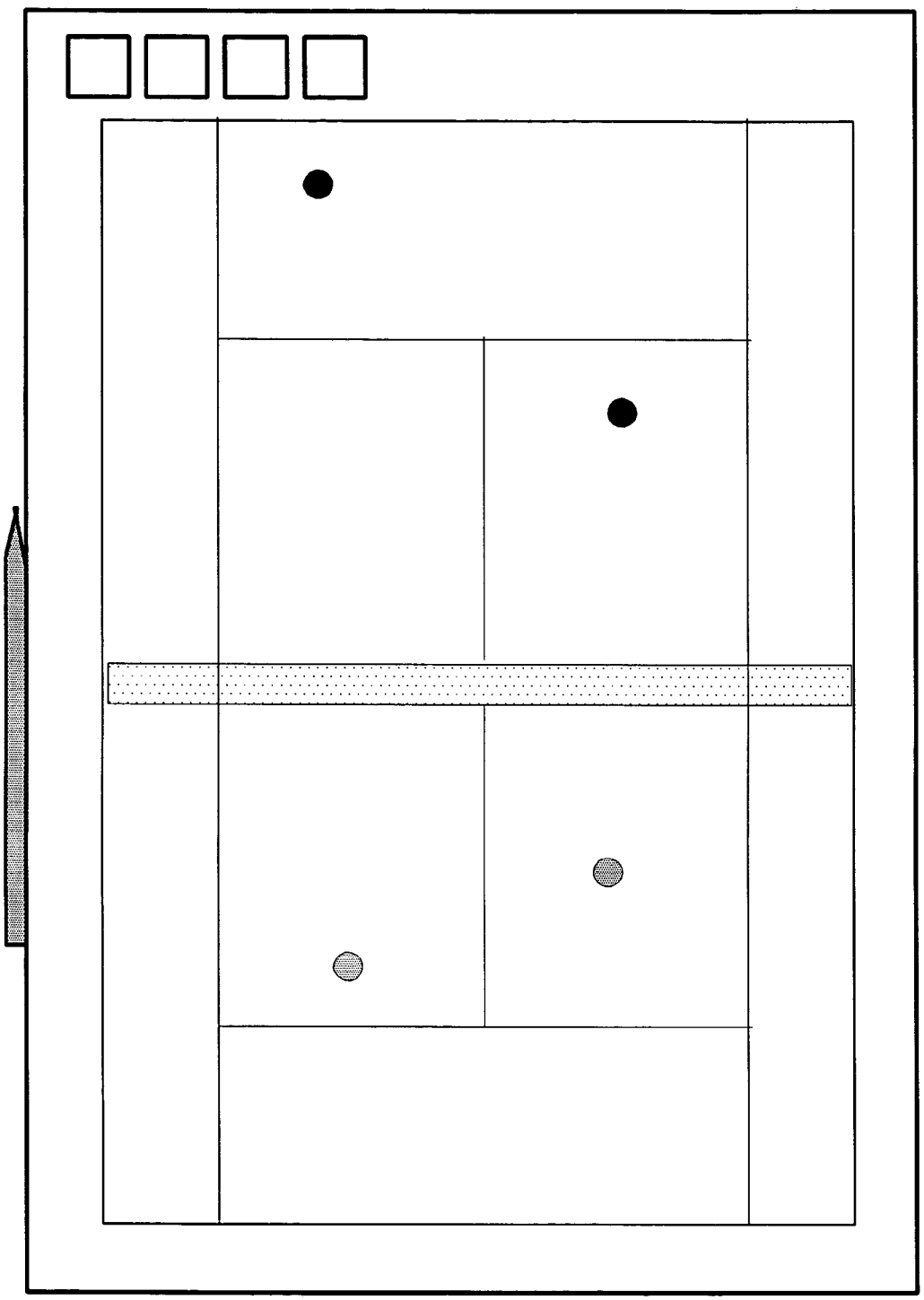
FIG. 10 is similar to FIG. 5 except that the sport is tennis.
Figure 11:
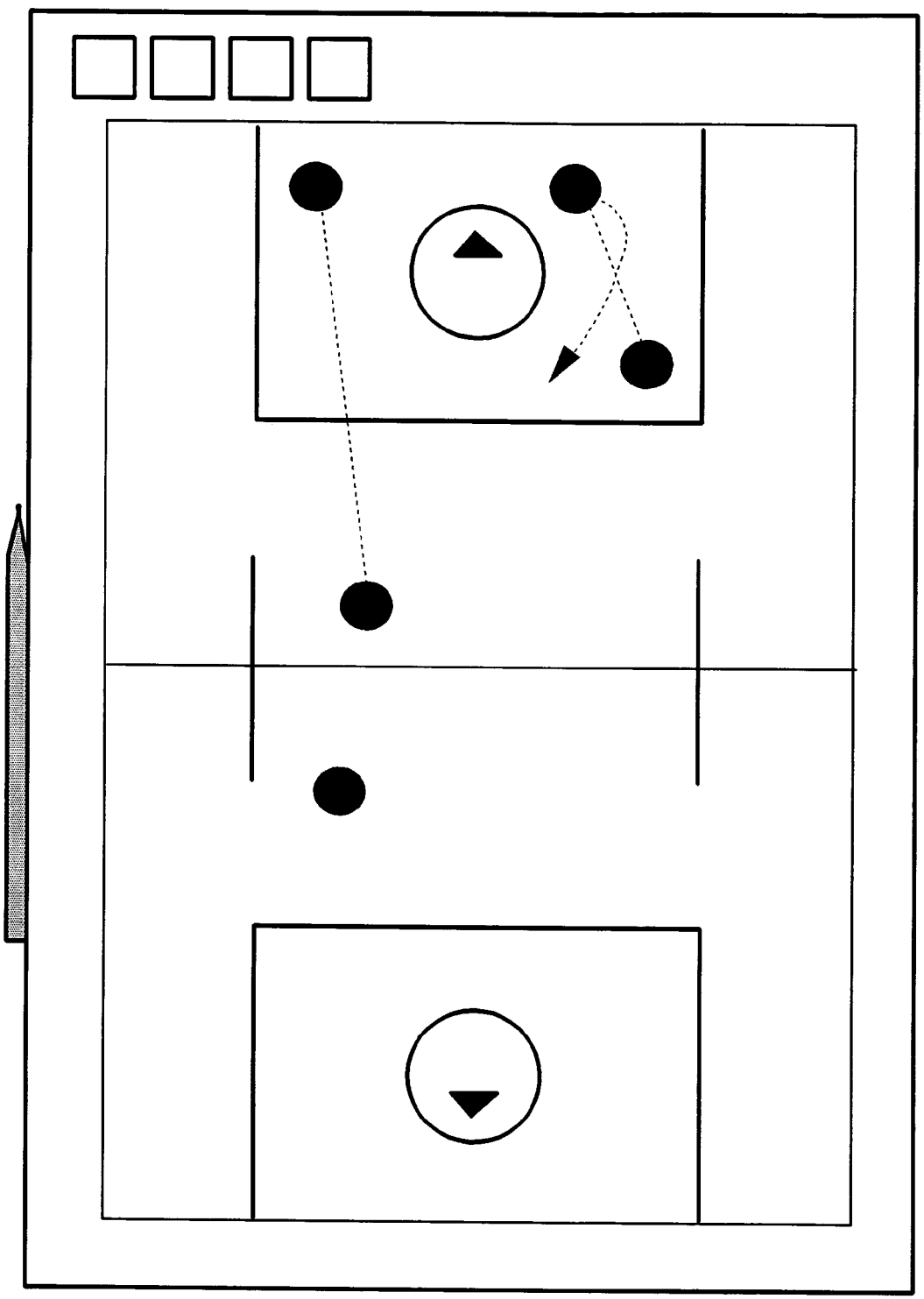
FIG. 11 is similar to FIG. 5 except that the sport is Lacrosse.
Figure 12:
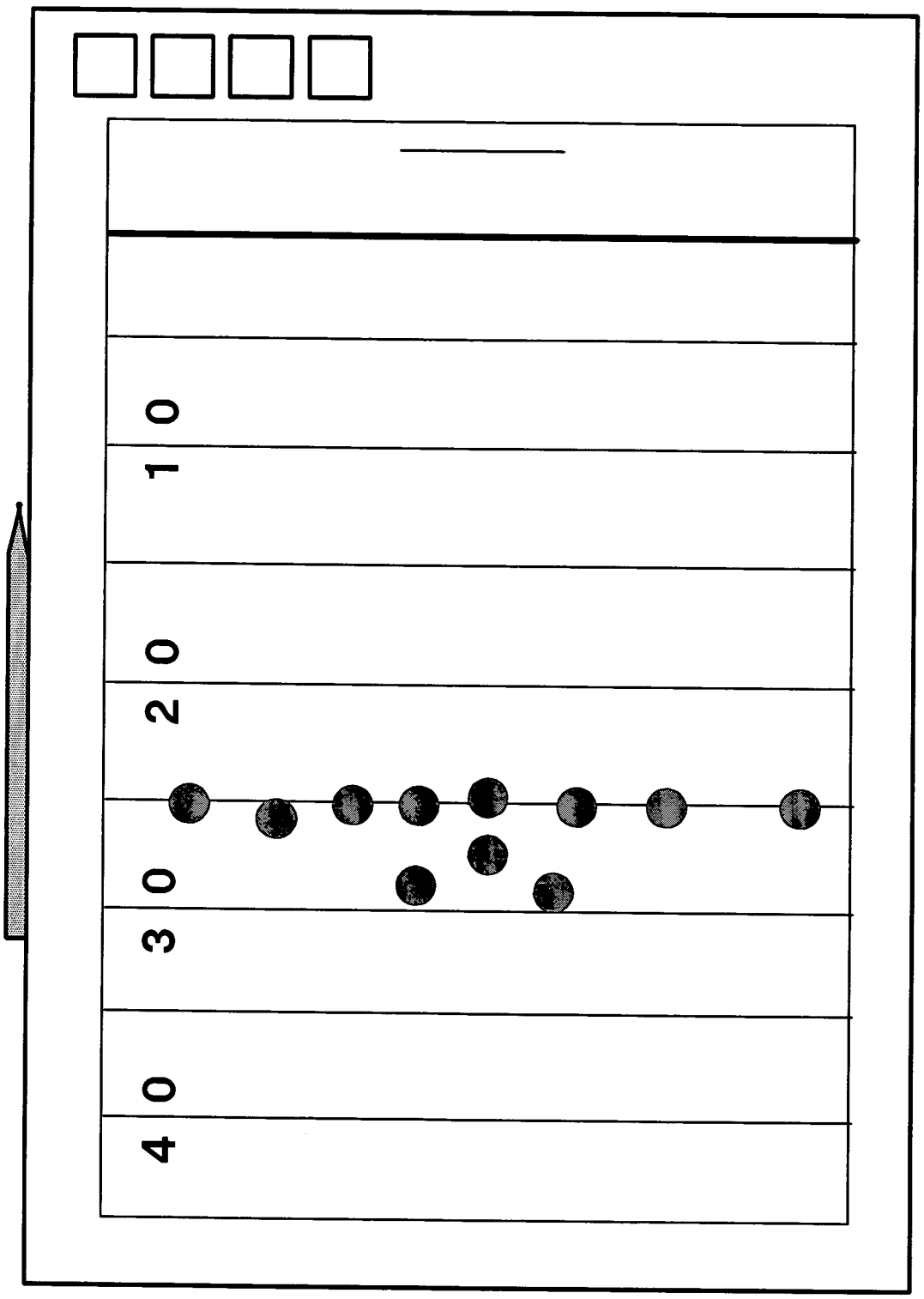
FIG. 12 is similar to FIG. 5 except that the sport is football.

FIG. 4 shows a blank display as it might look right after power-up. FIGS. 5-12 show the display as it might look for different sports. The coach's clipboard of the present invention is adapted to display parameters from any number of sports. Parameters for new sports may also be added. FIGS. 5-12 show screens with parameters and plays from a variety of sports. FIG. 5 shows a basketball play; FIG. 6 a baseball screen; FIG. 7 an ice-hockey play; FIG. 8 a soccer play; FIG. 9 a volleyball play; FIG. 10; tennis; FIG. 11, Lacrosse and FIG. 12 an offensive football play. As can be seen from FIG. 12, the play consists generally of player starting locations.

Figure 13:
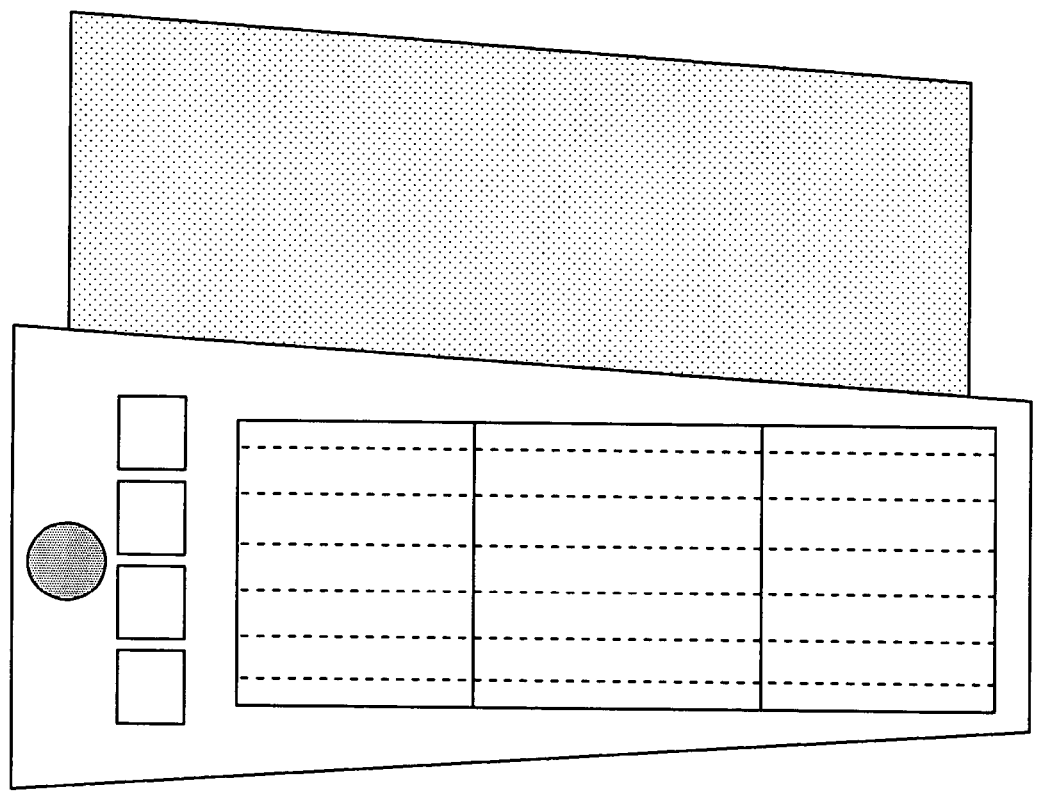
FIG. 13 shows a play menu displayed on a player local unit.
Figure 14A:
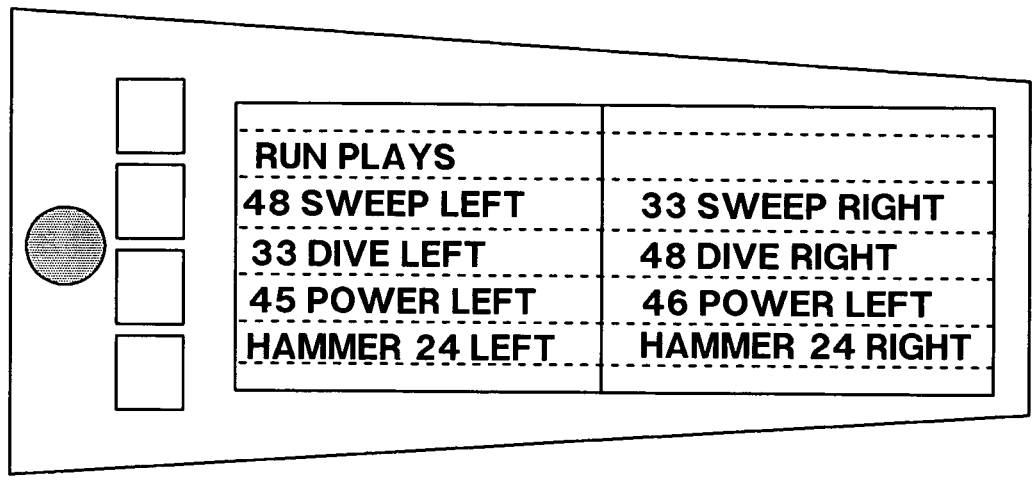
FIGS. 14A-14B show play selections and a play displayed.
Figure 14B:
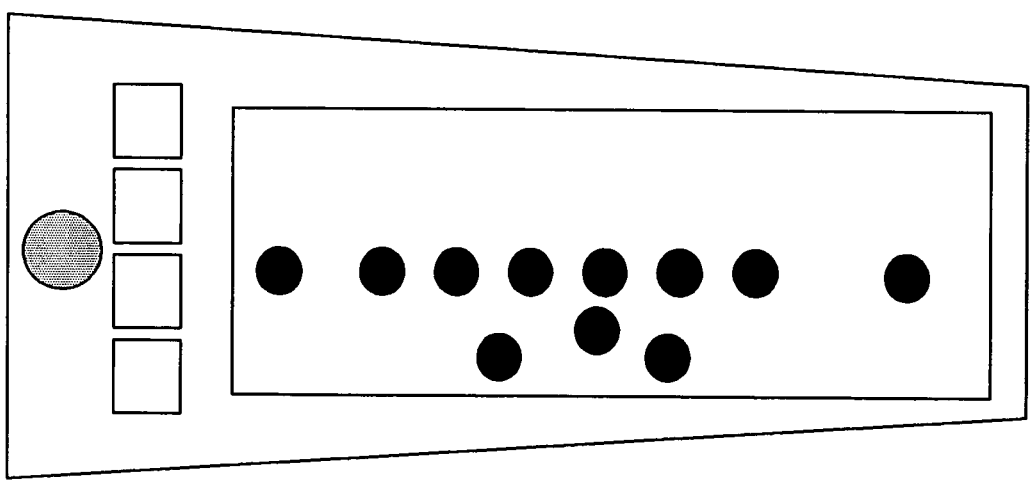

FIG. 13 shows a straight-on view of an embodiment of the player's wrist unit. The screen shows a menu of possible plays. The buttons to the left of the screen can be used to bring up any particular play from the menu. FIGS. 14A-14B show the embodiment of FIG. 13 with a play number selected in FIG. 14B.

Figure 15:
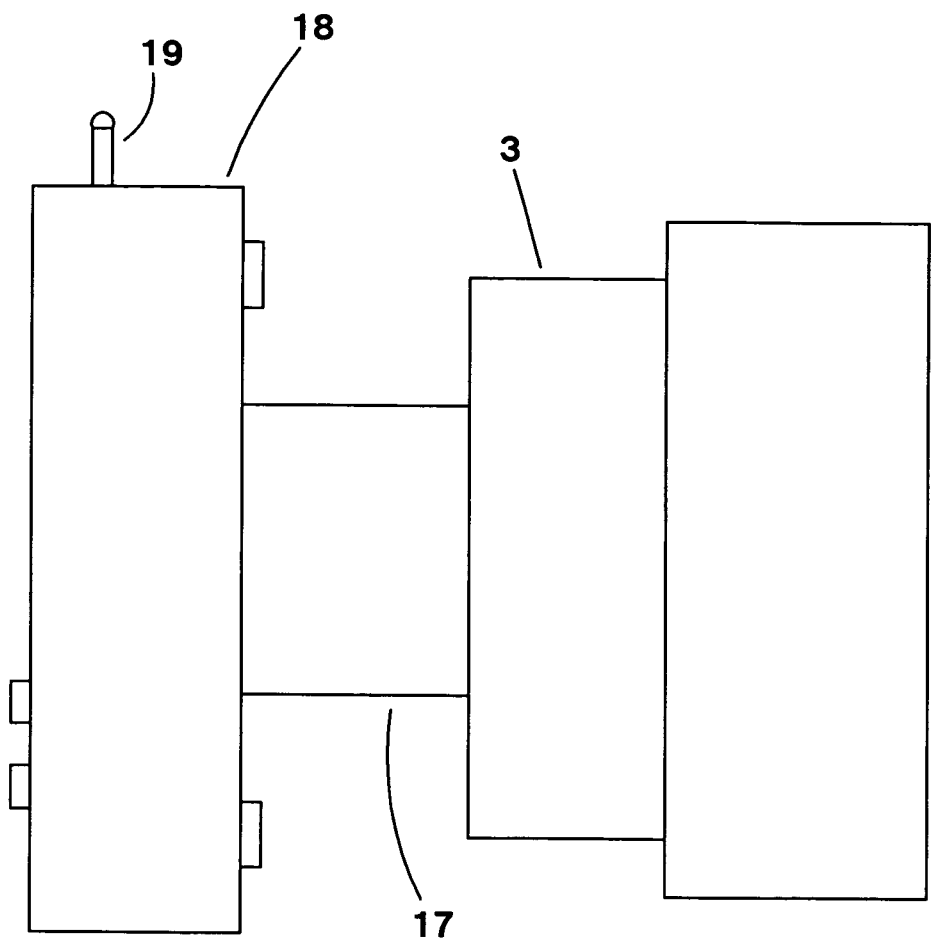
FIG. 15 is shows a transmitting camera.

FIG. 15 shows an embodiment of a transmitting camera 3 that can be used to forward photos or video to the coach's clipboard or the player's personal unit or both. There is a camera part 17 with lenses and optical equipment that photographs the play, a transmitter part 18 with a radio antenna 19.

Several descriptions and illustrations have been presented to better aid in the understanding of the present invention. One skilled in the art will realize that numerous changes and variations can be made without departing from the spirit of the invention. All of these changes and variations are within the scope of the present invention.

I claim:

1. A method in multi-player team sport being played on a field that allows a coach located off of the field to send a graphical play instruction to a group of players on the field by wireless communication comprising:

adapting a handheld coach electronic clipboard to with a writeable display screen to display a plurality of different screens depictions, each screen depiction presenting a top-down view of a playing field for a particular team sport;

providing capability for said coach to enter onto a depicted playing field on said screen a graphical team play instruction, said graphical team play instruction showing player movements for a plurality of players, wherein said graphical team play instruction can be stored in a play memory contained in said handheld coach electronic clipboard;

providing capability to retrieve said graphical team play instruction on said depicted playing field from said play memory and display it on said writeable screen;

providing capability to modify said graphical team play instruction on said writeable screen and to re-store it in said play memory;

providing capability to wirelessly transmit said graphical team play instruction from said coach electronic clipboard off the field to a wrist-worn player electronic display unit worn by a player on the field;

providing capability to display said graphical team play instruction on said depicted playing field on said wrist-worn player electronic display unit.

2. The method of claim 1 further comprising providing a second memory in said wrist-worn player electronic display unit which can store said graphical team play instruction on said depicted playing field.

3. The method of claim 1 further comprising adapting said handheld coach electronic clipboard to store a photograph taken from a remote camera.

4. The method of claim 3 wherein said handheld coach electronic clipboard can transmit said photograph to said wrist-worn player electronic display unit.

5. A method in multi-player team sport being played on a field that allows a coach located off of the field to send a graphical play instruction relating to a particular play to a group of players on the field by wireless communication comprising:

provdiing capability for the coach to display a plurality of different playing field depictions each for a different team sport on a handheld electronic clipboard having a writeable display screen;

providing capability for the coach to draw a graphical team play instruction on said writeable display screen on one of said playing field depictions, said graphical team play instruction showing movements for a plurality of players to be performed when the play is executed;

providing capability in said handheld electronic clipboard to wirelessly transmit said playing field depiction and said graphical team play instruction to a wrist-worn unit worn by a player on a physical playing field during a game, said wrist-worn unit having a display that displays the transmitted playing field depiction and said graphical team play instruction.

6. The method of claim 5 wherein said electronic clipboard can store said graphical team play instruction.

7. The method of claim 5 wherein said wrist-worn unit can store said graphical team play instruction.

\* \* \* \* \*